United States Patent [19]

Grebe, Jr. et al.

[11] 4,262,543

[45] Apr. 21, 1981

[54] MAGNETIC FLOWMETER HAVING MULTIPLE STAGE AMPLIFIER WITH AUTOMATIC ZEROING

[75] Inventors: John C. Grebe, Jr., Norristown; William R. Freund, Jr., Hatfield, both of Pa.

[73] Assignee: Emerson Electric Co., St. Louis, Mo.

[21] Appl. No.: 82,762

[22] Filed: Oct. 9, 1979

[51] Int. Cl.³ .............................................. G01F 1/60
[52] U.S. Cl. ...................... 73/861.17; 330/9
[58] Field of Search ................. 73/861.16, 861.17; 330/9

[56] References Cited

U.S. PATENT DOCUMENTS

| 3,903,875 | 9/1975 | Hughes | 330/85 X |
| 4,210,022 | 7/1980 | Boss | 73/861.17 |

Primary Examiner—Charles A. Ruehl
Attorney, Agent, or Firm—Polster, Polster and Lucchesi

[57] ABSTRACT

A magnetic flowmeter system includes an automatic zeroing system for a multiple stage amplifier. The zeroing system includes a circuit for sequencing the turn-off time of the zeroing amplifiers such that the first stage zeroing amplifier is turned off before later stages, thereby reducing the effects of zeroing errors introduced when the zeroing amplifier for the first stage signal amplifier is put into a hold state.

5 Claims, 3 Drawing Figures

MAGNETIC FLOWMETER HAVING MULTIPLE STAGE AMPLIFIER WITH AUTOMATIC ZEROING

BACKGROUND OF THE INVENTION

This invention relates to a magnetic flowmeter amplifier system, and in particular to a multiple stage amplifier system having an improved automatic zeroing function.

In an electromagnetic flowmeter a magnetic field across a flow tube generates a voltage in a fluid flowing through the tube. The voltage, which is proportional to flow rate, is sensed by a pair of electrodes in contact with the fluid and amplified by a signal processing system to produce an output signal which is proportional to flow rate.

It is now common for the magnetic field to be generated by a pulsed direct current applied to coils associated with the meter. The meter therefore produces a train of output pulses separated by periods of zero output.

To maintain the output offset of the amplifier at a suitably low level, it is desirable to provide the amplifier with an automatic zeroing circuit, to drive the output to a zero reference level when its input level is nominally zero; that is, during the intervals between pulses when no signal representative of flow is present.

An automatic zeroing circuit typically includes a switch for switching the zeroing circuit into a feed-back loop around the amplifier and an integrating operational amplifier for driving the output of the amplifier to zero when the switch is closed. When the switch is open, the output of the integrating operational amplifier remains at the same voltage as long as the input remains the same, thereby maintaining the reference voltage of the amplifier at the same level.

The amplification of a magnetic flowmeter signal processing system is preferably carried out by a cascaded multiple stage amplifier system including at least a first amplifier and a second amplifier. When two amplifiers, each provided with such an automatic circuit, are cascaded, however, a substantial error (typically on the order of fifty millivolts) is introduced. An error of this magnitude is unacceptable in a magnetic flowmeter.

SUMMARY OF THE INVENTION

One of the objects of this invention is to provide a magnetic flowmeter in which the signal processing system includes a multiple stage amplifier which is automatically zeroed throughout.

Another object is to provide such a system in which no substantial error is introduced by the automatic zeroing system, even when the amplifier system provides a high gain.

In accordance with this invention, generally stated, a magnetic flowmeter is provided comprising a body adapted to be connected in a flow system for measuring the flow of a fluid therethrough, electromagnetic coil means for generating a magnetic field in the fluid flowing through the body, a pair of electrodes for producing a voltage dependent on the electric field generated in the fluid flowing through the magnetic field, and signal processing means for converting the output voltage to an output signal, wherein the signal processing means comprise a multiple stage amplifier system including first amplifier means and second amplifier means connected in cascade with the first amplifier means. The first amplifier means comprise an amplifier, an automatic zeroing circuit connected in a feedback circuit around the amplifier, and switch means for turning the zeroing circuit on and off. The second amplifier means also comprise an amplifier, an automatic zeroing circuit connected in a feedback circuit around the amplifier, and switch means for turning the zeroing circuit on and off. Timing means sequentially turn off the zeroing circuit of the first amplifier means and then turn off the zeroing circuit of the second amplifier means, thereby zeroing, in the input to the second amplifier means, any error produced by turning off the zeroing circuit of the first amplifier means.

In the preferred embodiment, the zeroing circuits each comprise an integrating operational amplifier. Preferably, the timing means control the electromagnetic coils to generate an intermittent magnetic field in the fluid flowing through the body and cause the zeroing circuits to be on while the magnetic field is off. In one embodiment, the timing means turn the zeroing circuits on together, and in another, the timing means turn off the zeroing circuit of the first amplifier means before turning on the zeroing circuit of the second amplifier means.

It has been found that the error produced in a multiple stage amplifier when automatic zeroing circuits are employed at each stage arises primarily at the moment of disconnecting the zeroing circuit from the output of the first stage amplifier. The error appears as an offset of about one millivolt at the output side of the first stage amplifier, but is multiplied by the gain of the next stage. This is not a sample-and-hold drift or droop of the integrating capacitor, but rather a one-time change when the switch between the amplifier output and the feedback amplifier input is opened. The cause of this one-time change may be charge injection or a slight change in capacitor voltage when the active zero feedback is removed.

Other aspects of the invention will better be understood in light of the following description of the preferred embodiments.

DESCRIPTION OF THE PREFERRED EMBODIMENT

Figure 1:
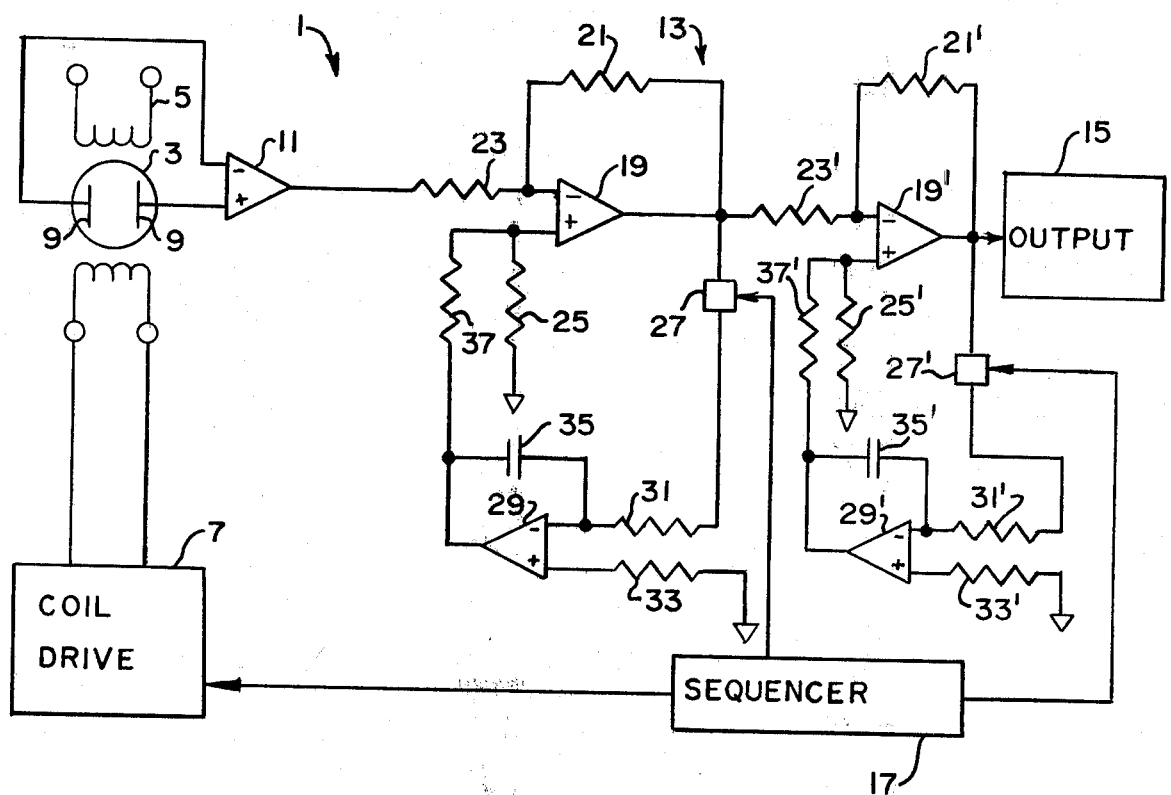
FIG. 1 is a circuit diagram of a magnetic flowmeter including the multiple stage amplifier with automatic zeroing of the present invention.

Referring now to the drawings, and in particular to FIG. 1, reference numeral 1 indicates a magnetic flowmeter system incorporating the present invention. The flowmeter system 1 includes a flow tube 3, a pair of oppositely disposed electromagnetic coils 5 energized from a source 7, and a pair of electrodes 9 which sense a voltage generated by the flow of an electrically conductive fluid through the magnetic field produced by the coils 5 across the tube 3. The voltage across the electrodes 9 is amplified by a differential preamplifier 11, is further amplified by a two stage amplifier system 13 of the present invention, and is fed to a signal processing chain 15 which produces an output signal indicative of flow through the tube 3. In this illustrative embodiment, the coil driver 7 is controlled by a sequencer 17 to produce through the coils 5 pulses of direct current of controlled duration at controlled intervals. All of the components except the amplifier system 13 and sequencer 17 may be conventional.

The first stage of the amplifier system 13 includes a standard inverting operational amplifier having a gain determined by the relationship between resistors 21 and 23. The non-inverting input of the amplifier 19 is grounded through bleed resistor 25. Connected between the output of the first stage amplifier 19 and its non-inverting input is a zeroing circuit consisting of a solid state switch 27 controlled by the sequencer 17, an operational amplifier 29, resistors 31 and 33, integrating capacitor 35, and resistor 37. It will be seen that this arrangement is a typical zeroing circuit, with the feedback operational amplifier 29 connected as an integrator.

The output of the first stage amplifier 19 is connected to a second inverting amplifier stage, which may be identical with the first stage. Corresponding parts of the second amplifier stage are indicated by corresponding primed reference numerals.

In the operation of the amplifier system 13, when the sequencer 17 cuts off the current to the coil, and the voltage produced across the electrodes 9 is cut off, the sequencer closes the first switch 27 and the zeroing circuit of the first amplifier 19 drives the voltage across the capacitor 35 to a value sufficient to maintain the output of the amplifier 19 at zero volts. When the switch 27 is opened, the charge on the capacitor 35 maintains the zeroed setting at the non-inverting input of the amplifier 19, except for a slight offset introduced at the moment of opening the switch 27.

The second stage amplifier 19' is zeroed by its zeroing circuit in precisely the same way.

Figure 2:
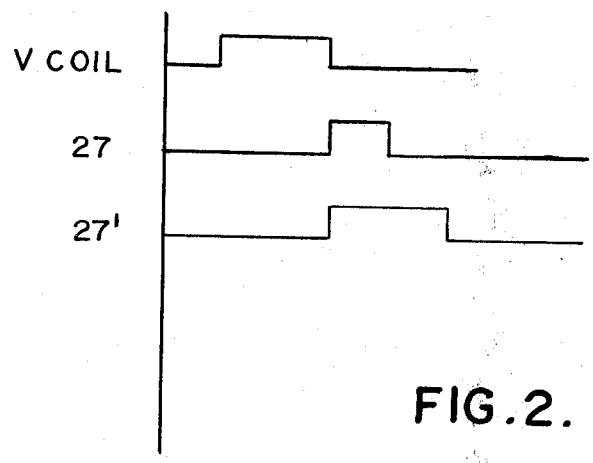
FIG. 2 is a timing diagram of a first embodiment of the flowmeter of FIG. 1.

As shown in FIG. 2, in the preferred embodiment, the sequencer 17 removes the flow-dependent voltage pulse $V_{coil}$ at the inverting input of the first stage amplifier and simultaneously turns on both switches 27 and 27' of the first and second stage zeroing circuits. After a predetermined zeroing period, the sequencer turns off the first stage zeroing circuit by opening the switch 27, thereby maintaining a fixed reference voltage for the amplifier 19 and maintaining the output of the amplifier 19 constant so long as the input remains the same. The second stage amplifier zeroing circuit is left on for an additional period, however, to allow it to compensate for the error introduced at the moment of switching off the first switch 27. When the second switch 27' is opened, a similar small offset is created; however this small offset is insignificant in relation to the magnitude of the amplified flow-dependent signal.

Figure 3:
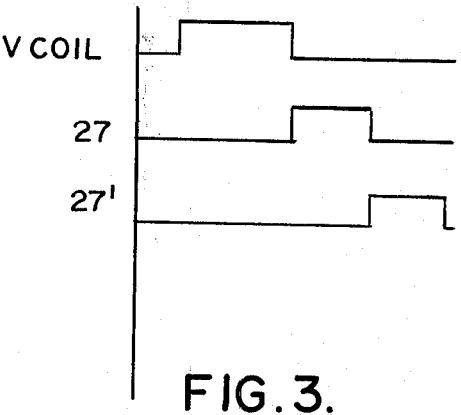
FIG. 3 is a timing diagram of a second embodiment of the flowmeter of FIG. 1.

Numerous variations in the magnetic flowmeter system of the present invention, within the scope of the appended claims, will occur to those skilled in the art in light of the foregoing disclosure. For example, as shown in FIG. 3, the sequencer may close only the first switch 27 simultaneously with cutting off the flow-dependent voltage to the amplifier system, and may open it simultaneously with closing the second switch 27' to initiate active zeroing of the second stage amplifier. Settling times may be provided before closing one or both of the switches 27 and 27'. Other zeroing circuits may be used. These variations are merely illustrative.

We claim:

1. In a magnetic flowmeter comprising a body adapted to be connected in a flow system for measuring the flow of a fluid therethrough, means for generating a magnetic field in the fluid flowing through the body, a pair of electrodes for producing a voltage dependent on the electric field generated in the fluid flowing through the magnetic field, and signal processing means for converting the output voltage to an output signal, the improvement wherein said signal processing means comprise a multiple stage amplifier system including first amplifier means and second amplifier means connected in cascade with said first amplifier means, said first amplifier means comprising an amplifier, an automatic zeroing circuit connected in a feedback circuit around said amplifier, and switch means for turning said zeroing circuit on to provide active zeroing and off to hold a zeroed reference voltage for said amplifier, said second amplifier means comprising an amplifier, an automatic zeroing circuit connected in a feedback circuit around said amplifier, and switch means for turning said zeroing circuit on to provide active zeroing and off to hold a zeroed reference voltage for said amplifier, and timing means for sequentially turning off said zeroing circuit of said first amplifier means and then turning off said zeroing circuit of said second amplifier means, thereby zeroing in said second amplifier means any error produced by turning off said zeroing circuit of said first amplifier means.

2. The improvement of claim 1 wherein said zeroing circuits each comprise an integrating operational amplifier.

3. The improvement of claim 2 wherein said timing means comprise means for controlling said means for generating a magnetic field in such a way as to generate an intermittent magnetic field in the fluid flowing through the body, said timing means being connected to said switch means of said first and second amplifier means such that said switch means cause said zeroing circuits to be on while said magnetic field is off.

4. The improvement of claim 3 wherein said timing means turn said zeroing circuits on together.

5. The improvement of claim 3 wherein said timing means turn off said zeroing circuit of said first amplifier means before turning on said zeroing circuit of said second amplifier means.

* * * * *

UNITED STATES PATENT AND TRADEMARK OFFICE
CERTIFICATE OF CORRECTION

PATENT NO. : 4,262,543
DATED : April 21, 1981
INVENTOR(S) : John C. Grebe et al

It is certified that error appears in the above—identified patent and that said Letters Patent is hereby corrected as shown below:

Column 1, line 42, "automatic circuit" should be "automatic zeroing circuit".

Signed and Sealed this

Eighth Day of December 1981

[SEAL]

Attest:

Attesting Officer

GERALD J. MOSSINGHOFF

Commissioner of Patents and Trademarks